Sept. 16, 1952  N. L. WATT ET AL  2,610,627
DOUCHE NOZZLE
Filed Feb. 28, 1950

INVENTORS.
Naomi L. Watt.
Harold F. Fehlberg.
BY
Harness, Dickey & Pierce
ATTORNEYS.

“Patented Sept. 16, 1952

2,610,627

UNITED STATES PATENT OFFICE 2,610,627

DOUCHE NOZZLE

Naomi Lee Watt and Harold F. Fehlberg, Detroit, Mich.

Application February 28, 1950, Serial No. 146,826

5 Claims. (Cl. 128—239)

This invention relates to vaginal nozzles and particularly to a nozzle of this type which is adapted to receive a medicament or the like in the discharge end thereof.

An important object of the present invention is to provide a vaginal nozzle having an improved flushing action.

Another object of the invention is to provide a nozzle of the above-mentioned character having novel means for introducing and confining the medicament in the nozzle.

Still another object of the invention is to provide a nozzle of the above-mentioned character which is efficient in operation, relatively inexpensive to manufacture, and attractive in appearance.

Other objects and advantages of the invention will be apparent during the course of the following description.

In the drawing forming a part of this specification and wherein like numerals are employed to designate like parts throughout the same:

Figure 1:
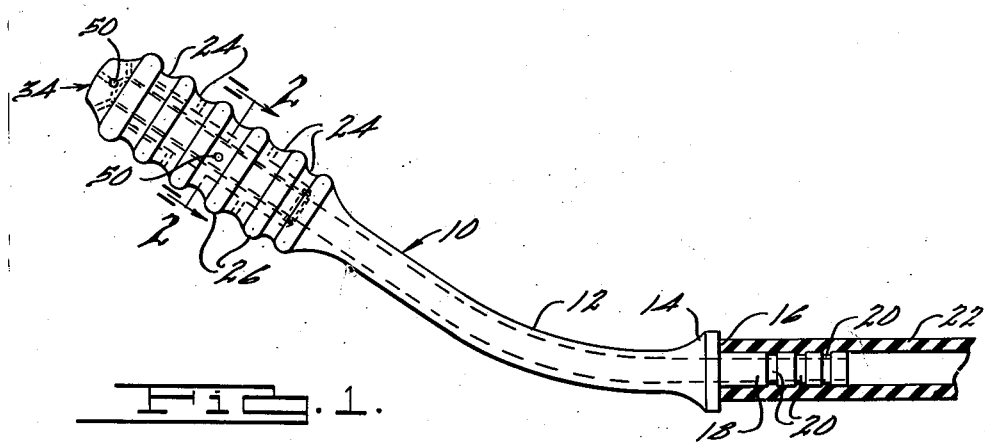
Fig. 1 is a side elevational view of a nozzle embodying the invention and showing the same attached to a fragmentary hose portion.
Figure 2:
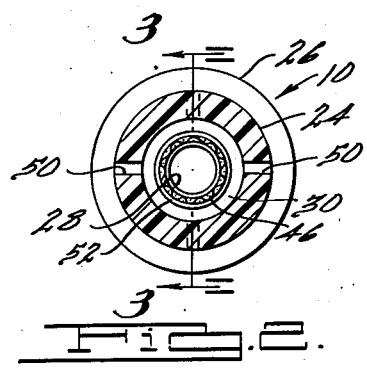
Fig. 2 is an enlarged, transverse sectional view taken on the line 2—2 of Fig. 1.

The nozzle embodying the present invention comprises an elongated body 10 which conveniently can be made of plastic or the like. The body 10 is slightly curved as at 12 and the inner end 14 thereof is slightly enlarged to define a radial shoulder 16. Projecting from the shoulder 16 is a shank 18 of materially reduced diameter and the shank is formed with a plurality of longitudinally spaced external grooves 20. As clearly shown in the drawing, the shank 18 is adapted for insertion into a rubber tubing 22 or the like. The tubing 22 preferably is pushed onto the shank 18 until it abuts against shoulder 16. In the form of the invention shown, the shank 18 is slightly larger than the internal passage of the tubing so that the latter is stretched slightly by insertion of the shank. As a result, the rubber material of tubing 22 tends to flow into grooves 20 and thus assists in holding the tubing on the shank.

The distal terminal portion of the shank 10 is radially enlarged and is formed with a plurality of longitudinally spaced, annular, external grooves 24 each of which extends entirely around the shank. As clearly shown in the drawing, the grooves 24 define a plurality of intermediate ridges 26, and the ridges are rounded so as to blend smoothly with the grooves 24.

A longitudinal passage 28 extends entirely through the body 10, and the portion of the passage extending through the enlarged terminal portion of the body is radially enlarged to define an annular radial shoulder 30 at the inner or proximal end of the enlarged portion. The enlarged portion of the passage defines a chamber 32 which is adapted to receive a douche powder, pill, or other medicament in use.

Figure 3:
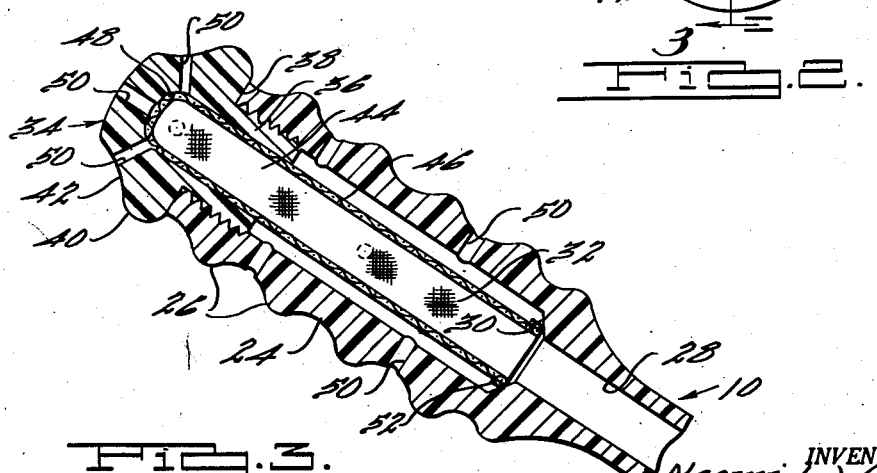
Fig. 3 is a fragmentary, longitudinal sectional view taken on the line 3—3 of Fig. 2.

Closing into the open distal end of the chamber 32 is a cap 34. As perhaps best shown in Fig. 3, the cap 34 has an externally screw-threaded shank portion 36 which extends into the chamber 32 and a radial shoulder 38 which abuts the end of the body 10. The shoulder 38 extends outwardly radially beyond the adjacent confronting end of the body 10 and is rounded, as at 40, to define a terminal annular ridge 40. Also, the cap 34 preferably is peripherally concaved, as at 42, immediately in front of the annular ridge 40. The cap 34 is formed with a hollow interior 44, and a generally cup-shaped screen 46 is press fitted into the cap. In this connection it will be observed that the screen 46 has a closed end 48 within the cap and that the screen extends from the cap to seat against the annular shoulder 30. The seated distal end of the screen preferably is strengthened or reinforced by a surrounding metal ferrule 52. Radial apertures 50 connect the chamber 32 with each of the grooves 24 and the interior of cap 34 with the concaved surface 42 and with the end surface of the cap.

From the foregoing it will be readily apparent that the cap 34 is readily removable from the body 10 and that the screen 46 is removable with the cap. Since the chamber 32 is adapted to receive a medicament it is desirable to remove the cap 34 periodically so that the wall of the chamber can be cleaned. Also, the cap and screen assembly provides a convenient means of inserting medicament into the chamber. When the cap 34 is removed, the screen 46 is readily accessible and the medicament can be readily introduced into the open distal end thereof. After the medicament has been inserted into the screen, the latter is inserted into the chamber 32 and the cap 34 is screwed tightly in place. Manifestly the medicament is introduced into the chamber 32 with the screen. A nontoxic screen which is inert to water and the medicament used in the device preferably should be used, and any suitable size mesh can be employed. The primary purpose of the screen is to confine the medicament and to hold it within the chamber 32 until it is completely dissolved by water traversing the nozzle, thus preventing the medicament from lodging or caking in and clogging the apertures 50.

In practice, the hose or tubing 22 is attached to a conventional faucet (not shown) or other suitable source of water under pressure and at a suitable temperature. Manifestly this water flows through the hose and into the nozzle 10 where it is discharged through the radial apertures 50. Since the water must flow through the screen 46 before entering apertures 50 and since the medicament is confined within the screen, it is continuously dissolved in the water as it flows through the nozzle. Thus, a continuous medicated solution is discharged from the nozzle.

In addition to the above, the provision of external annular grooves 24 makes the nozzle superior to conventional devices of this type which conventionally are provided with circumferentially spaced longitudinal external grooves. The latter construction brings the water in contact with only a limited area of the vaginal wall whereas the instant device will effect a complete contact therewith and assure a more thorough cleansing action. In this connection it will be apparent that medicated water solution will completely fill each of the grooves 24 so that the solution is brought into contact with the vaginal wall entirely around the nozzle. By oscillating the nozzle back and forth, the solution is brought into contact with the entire surface of the wall and an efficient but non-irritating scrubbing action is achieved by the ridges 26.

Having thus described the invention, we claim:

1. A vaginal nozzle comprising an elongated body having a longitudinal through passage, a plurality of longitudinally spaced annular grooves adjacent one end thereof and radial apertures connecting the bottoms of said grooves with the internal passage of the body; a hollow removable cap attached to the mentioned end of the body, the hollow interior of the cap communicating with the internal passage of said body so that fluid charged to the body through said passage enters said cap, a plurality of radial apertures in the end portion of said cap for discharging fluid in the cap exteriorly thereof; and a generally cup-shaped screen arranged with the closed end in and snugly fitting the hollow interior of the cap so as to be removable from the body with the cap, said screen extending from the cap into the longitudinal passage of the body and along the grooved portion thereof and across all the apertures which communicate with the external grooves of the body.

2. A vaginal nozzle comprising an elongated body having an enlarged terminal portion provided with a plurality of longitudinally spaced, external annular grooves, a longitudinal passage extending entirely through the body and provided with a radial shoulder adjacent the proximal end of said enlarged portion, radial apertures in the body extending from said grooves and opening into said passage a removable cap in the distal end of said passage and a tubular screen carried by and removable with said cap, said screen projecting into the passage from said cap and seating against said radial shoulder, said screen adapted to receive a medicament and operative to confine the latter within the passage while at the same time permitting it to dissolve in liquid charged to the passage and discharged through said apertures.

3. A vaginal nozzle comprising an elongated body, a longitudinal passage extending entirely through the body and provided with an internal radial shoulder, radial apertures in the body between said internal radial shoulder and the end of said passage, a removable cap in the end of said passage, and a tubular screen carried by and removable with said cap, said screen projecting into the passage from said cap and seating against said radial shoulder, said screen adapted to receive a medicament and operative to confine the latter within the passage while at the same time permitting it to dissolve in liquid charged to the passage and discharge through said apertures.

4. A vaginal nozzle comprising an elongated body having a longitudinal through passage and radial apertures extending from the passage adjacent the end of the latter; a hollow removable cap attached to the body at the mentioned end of the passage, the hollow interior of the cap communicating with the internal passage of the body so that fluid charged to the body through said passage enters said cap, a plurality of radial apertures in the end portion of said cap for discharging fluid in the cap exteriorly thereof, and a generally cup-shaped screen arranged with the closed end in and snugly fitting the hollow interior of the cap so as to be removable from the body with the cap, said screen adapted to receive a medicament extending from the cap into the longitudinal passage of the body and across said apertures.

5. A vaginal nozzle comprising an elongated body having a longitudinal through passage and a plurality of radial apertures extending from the passage adjacent one end thereof, a removable cap attached to the body at the mentioned end of the passage, and a tubular screen adapted to receive a medicament attached to and removable from the body with said cap, said screen extending from the cap into the longitudinal passage of the body and across said apertures and being operative to confine medicament within the passage while at the same time permitting it to dissolve in liquid discharged through the passage and through said apertures.

NAOMI LEE WATT.
HAROLD F. FEHLBERG.

REFERENCES CITED

The following references are of record in the file of this patent:

UNITED STATES PATENTS

| Number | Name | Date |
|---|---|---|
| 845,249 | Morris | Feb. 26, 1907 |
| 1,338,710 | Szyperski | May 4, 1920 |
| 1,602,215 | Smith | Oct. 5, 1926 |
| 2,212,706 | Cohn et al. | Aug. 27, 1940 |
| 2,470,293 | D'Angelo | May 17, 1949 |